(No Model.)

M. KINSEY.
HORSE BOOT.

No. 381,388. Patented Apr. 17, 1888.

WITNESSES: INVENTOR.
C. R. Bennett
H. E. Runz
Moses Kinsey,
BY Drake & G., ATTY'S.

UNITED STATES PATENT OFFICE.

MOSES KINSEY, OF NEWARK, NEW JERSEY.

HORSE-BOOT.

SPECIFICATION forming part of Letters Patent No. 381,388, dated April 17, 1888.

Application filed October 3, 1887. Serial No. 251,306. (No model.)

*To all whom it may concern:*

Be it known that I, MOSES KINSEY, a citizen of the United States, residing at Newark, in the county of Essex and State of New Jersey, have invented certain new and useful Improvements in Horses' Boots; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
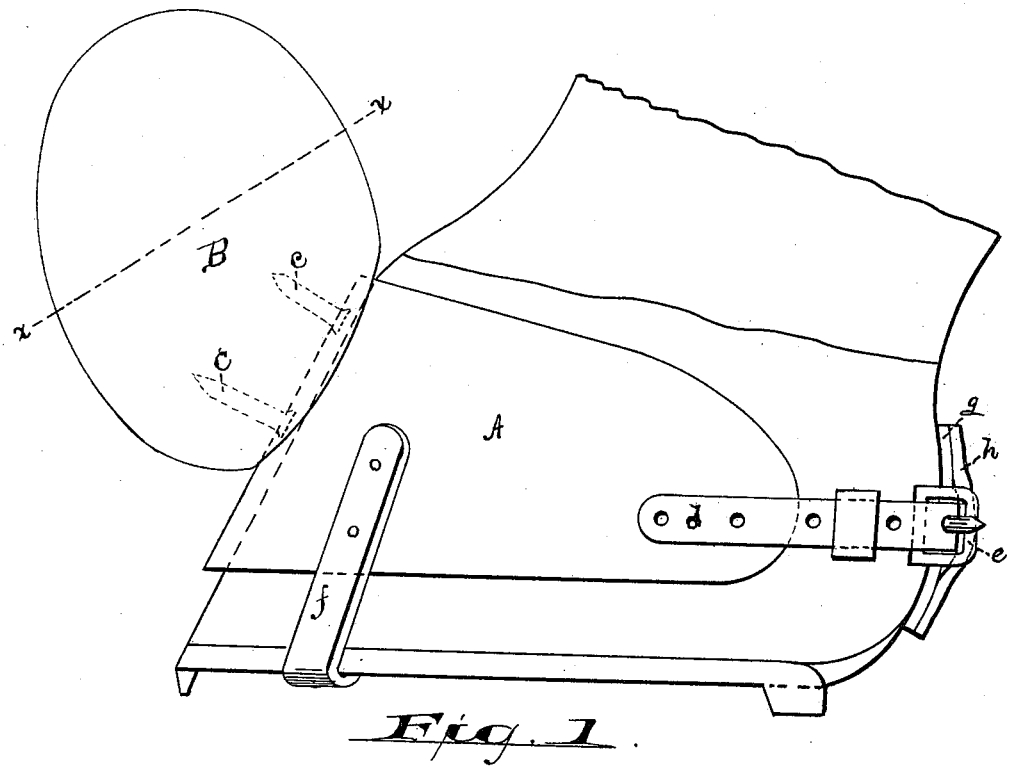
Figure 2:
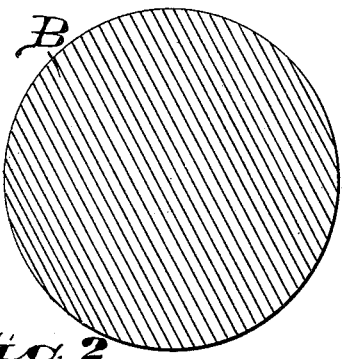
Figure 3:
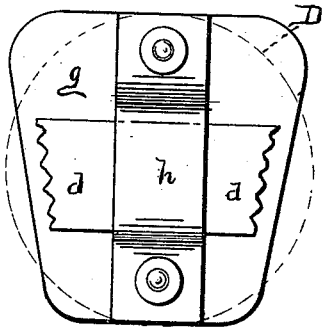
Figure 4:
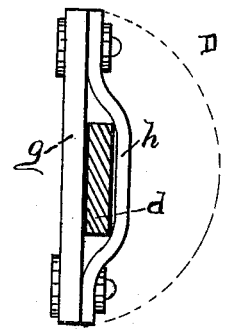

In said drawings, Figure 1 represents in side elevation my improved boot attached to a horse's foot. Fig. 2 is a cross-section through line $x$ of Fig. 1. Fig. 3 is a detail view in elevation, as seen from the back of the foot; and Fig. 4 is an edge view of Fig. 3.

Similar letters of reference indicate like parts in each of the several figures.

The object of this invention is to prevent a horse from resting the heel of one foot upon the front of the other—a habit which many valuable horses are addicted to—the result of which is damaging to the horses, as is well known.

The invention consists in a spring or flexible non-corrosive plate, A, of sufficient rigidity to hold the projection, hereinafter referred to, in place with firmness, or so as not to sag or give materially when the horse attempts to rest his one foot on the other. The said plate A is of spring metal, so as to spring around the horse's hoof when placed thereon, and yet possesses the quality common to certain grades of sheet brass of staying when bent to a certain extent, so that when the said plate is of a size too large to conform to the foot of the horse it may be bent and made of the proper size. Thus one boot may be readily made to conform to hoofs of widely-differing sizes. As above intimated, the flexible and yet rigid spring-plate carries an oval or spherical projection, B, made either of wood, metal, or other appropriate material, which is firmly secured to said plate A by means of screws $c$, or any other appropriate fastening—as solder or brazing. Said device is adapted to be secured to the hoof of a horse's foot by means of straps $d$ and buckle $e$, which are secured to said plate A by means of suitable rivets, and which straps pass around the back of the hoof and firmly secure said device, as before stated. Said plate A also carries a hook-shaped attachment, $f$, which is secured thereto by means of suitable rivets, the hooked ends of said attachment catching beneath the bottom of the hoof or shoe, thereby preventing it from slipping either upward or sideward, as will be understood.

The construction of the several parts above referred to and the mode of attachment of the device to the horse's foot will be readily understood by reference to Fig. 1.

At the back of the horse's hoof is a cushion, $g$, made of leather or other appropriate material, which intervenes between the straps $d$ and the frog of the foot to prevent any injury to the latter by the buckle and strap aforesaid. Said cushion is provided with a loop, $h$, through which said straps $d$ pass, all of which will be readily understood by reference to Figs. 1, 3, and 4.

The oval or spherical projection, above referred to, in the present case is made of wood and fastened in the manner described; but it is manifest that the said projection may be made of other material, or of sheet metal and be hollow, and be soldered or otherwise secured to the plate A, instead of being riveted. A somewhat similar projection, D, may be secured to the cushion $g$ at the back of the hoof, if desired, as indicated in Figs. 3 and 4 in outline.

The attachment $f$, securing the plate A from the bottom, may, if preferred, be formed integral with said plate, and thereby avoid the use of rivets and make a somewhat neater finish; or said attachment $f$ may be soldered or brazed in the same manner as stated in connection with the projection B, and said projections B and D may, if preferred, be made angular instead of oval or rounded.

Having thus described the invention, what I claim as new, and desire to secure by Letters Patent of the United States, is—

1. An improved boot for a horse's foot, combining therein a rigid spring-plate, A, adapted to conform to the shape of the hoof and carrying a projection, as B, and provided with means for securing the same to the hoof, substantially as and for the purposes set forth.

2. An improved boot for horses' feet, combining therein a flexible or spring plate, A, adapted to conform to the shape of the hoof and carrying a projection, as B, and provided with means for securing the same to the hoof, and a cushion, as $g$, said parts being arranged with relation to one another, substantially as and for the purposes set forth.

3. The combination of a flexible or spring plate, A, adapted to conform to a horse's hoof, a projection, as B, hooks, as $f$, and straps, as $d$, arranged with relation to each other and adapted to operate substantially as and for the purposes set forth.

4. The combination of a flexible or spring plate, A, adapted to conform to a horse's hoof, a projection, as B, hooks, as $f$, straps, as $d$, and a cushion, as $g$, said parts being arranged and adapted to operate substantially as and for the purposes set forth.

In testimony that I claim the foregoing I have hereunto set my hand this 27th day of September, 1887.

MOSES KINSEY.

Witnesses:
CHARLES H. PELL,
OSCAR A. MICHEL.